United States Patent
Döring et al.

(10) Patent No.: US 8,398,943 B2
(45) Date of Patent: Mar. 19, 2013

(54) ARRANGEMENT FOR REDUCING NITROGEN OXIDES IN EXHAUST GASES

(75) Inventors: Andreas Döring, München (DE); Florian Wälde, Dietenhofen (DE)

(73) Assignee: MAN Truck & Bus AG (DE)

( * ) Notice: Subject to any disclaimer, the term of this patent is extended or adjusted under 35 U.S.C. 154(b) by 98 days.

(21) Appl. No.: 12/969,434

(22) Filed: Dec. 15, 2010

(65) Prior Publication Data

US 2011/0085954 A1    Apr. 14, 2011

Related U.S. Application Data

(62) Division of application No. 11/772,035, filed on Jun. 29, 2007, now abandoned.

(30) Foreign Application Priority Data

Jul. 8, 2006    (DE) .................. 10 2006 031 659

(51) Int. Cl.
*B01D 47/00* (2006.01)

(52) U.S. Cl. .................................................. 423/210

(58) Field of Classification Search ............ 422/168, 422/171, 177; 423/210
See application file for complete search history.

(56) References Cited

U.S. PATENT DOCUMENTS

| | | | | |
|---|---|---|---|---|
| 4,977,127 A | * | 12/1990 | Rikimaru et al. | 502/309 |
| 6,045,765 A | * | 4/2000 | Nakatsuji et al. | 423/239.1 |
| 2003/0044520 A1 | * | 3/2003 | Kiessling et al. | 427/79 |
| 2003/0083196 A1 | * | 5/2003 | Korotkikh et al. | 502/326 |
| 2003/0110761 A1 | | 6/2003 | Minami | |
| 2005/0069476 A1 | | 3/2005 | Blakeman et al. | |

FOREIGN PATENT DOCUMENTS

| | | |
|---|---|---|
| DE | 4310962 | 2/1994 |
| DE | 19949046 | 5/2001 |
| WO | WO2005064130 | 7/2005 |
| WO | WO2006125525 | 11/2006 |

* cited by examiner

*Primary Examiner* — Tom Duong
(74) *Attorney, Agent, or Firm* — Robert W. Becker; Becker & Stachniak, P.C.

(57) ABSTRACT

An arrangement and method for reducing the nitrogen oxide content in the exhaust gas of an internal combustion engine with the aid of ammonia and/or ammonia-releasing reduction agents, whereby ammonia and/or ammonia-containing reduction agent is added to the exhaust gas stream upstream of a catalyst combination composed of an SCR catalyst and a subsequent $NH_3$-oxidation catalyst in such a way that a homogeneous mixture of exhaust gas and ammonia is present upstream of the SCR catalyst. To optimize the reaction or conversion of nitrogen oxides, disposed downstream of the combination of a first SCR catalyst and a first $NH_3$-oxidation catalyst is at least one second catalyst having SCR activity in order in this way to reduce the nitrogen oxides formed at the first $NH_3$-oxidation catalyst due to insufficient selectivity of the catalyst to nitrogen with not yet oxidized $NH_3$.

13 Claims, 2 Drawing Sheets

| NOx | NH3 | NOx | NH3 | NOx | NH3 | NOx | NH3 | NOx | NH3 |
|---|---|---|---|---|---|---|---|---|---|
| Upstream of the Catalyst System | | Downstream of the SCR Catalyst 5' | | Downstream of the NH₃-oxidation Catalyst 6' | | Downstream of the SCR catalyst 7' | | Downstream of the NH₃-oxidation catalyst 8 | |
| 1000 | 1200 | 220 | 400 | 300 | 100 | 210 | 10 | 212 | 0 |
| 1000 | 1000 | 220 | 200 | 280 | 20 | 260 | 2 | 260 | 0 |
| 1000 | 800 | 230 | 10 | 231 | 0 | 230 | 0 | 230 | 0 |

Fig. 5

ARRANGEMENT FOR REDUCING NITROGEN OXIDES IN EXHAUST GASES

CROSS-REFERENCE TO RELATED APPLICATIONS

The present application is a divisional application and therefore relates to the corresponding parent U.S. application Ser. No. 11/772,035, which was filed on Jun. 29, 2007 now abandoned.

The instant application should be granted the priority date of Jul. 8, 2006 the filing date of the corresponding German patent application 10 2006 031 659.2, as well as Jun. 29, 2007 the filing date of the corresponding U.S. application Ser. No. 11/772,035.

BACKGROUND OF THE INVENTION

The present invention relates to an arrangement and a method for reducing the nitrogen oxide content in the exhaust gas of an internal combustion engine with the aid of ammonia and/or ammonia-releasing reduction agents.

Nitrogen oxides belong to the limited exhaust gas components that are produced during combustion processes and the permissible emissions of which are continuously being lowered. In this connection, the reduction of the nitrogen oxides generally occurs with the aid of catalysts. In oxygen-rich exhaust gas, a reduction agent is additionally necessary in order to raise the selectivity and the $NO_x$ conversions. These methods have become known under the general term SCR processes, whereby SCR stands for "Selective Catalytic Reduction". They have been used for many years in the power plant industry, and in recent times also with internal combustion engines. A detailed description of such methods can be found in DE 34 28 232 A1. $V_2O_5$- containing mixed oxides, for example in the form of $V_2O_5/WO_3/TiO_2$, can be used as SCR catalysts. Typical of $V_2O_5$ percentages are between 0.2-3%. Ammonia or ammonia-releasing compounds, such as urea or ammonium formate in solid or dissolved form, are used in practical applications. For the conversion of one mole of nitric oxide, one mole of ammonia is necessary.

$$4NO+4NH_3+O_2 \Rightarrow 4N_2+6H_2O \qquad (1)$$

If a platinum-containing NO oxidation catalyst is disposed upstream of the SCR catalyst to form $NO_2$,

$$2NO+O_2 \leftrightarrow 2NO_2 \qquad (2)$$

the SCR reaction can be significantly accelerated and the low temperature activity can be considerably raised.

The SCR process causes special problems with the reduction of nitrogen oxides of internal combustion engines, and here in particular in vehicles, since care must be taken that there is no emission of unused ammonia. In contrast to the situation with power plants, in vehicles, no adequately precise and stable exhaust gas sensors are available for regulating the system and hence for avoiding NH3 emissions when an overdosing of reduction agent occurs. In addition, the use of $V_2O_5$ is problematic since at temperatures over 650° C. it sublimes, so that in recent times zeolite having the active substituents iron and/or copper and/or cobalt have been used.

In order despite the inadequate sensor technology to avoid undesired $NH_3$ emissions, without additional measures the SCR catalyst must be significantly over dimensioned in order to ensure adequate reliability against ammonia slippage. The situation can be improved if an $NH_3$-oxidation catalyst is provided downstream of the SCR catalyst. Such an arrangement is shown, for example, in DE 37 33 501 A1. Furthermore, it is known from EP 410 440 B1 to provide the SCR catalyst and the $NH_3$-oxidation catalyst on a common support or substrate.

Noble metals of the platinum group, as well as oxides thereof, can be used as the active material for the $NH_3$-oxidation catalyst. The intended task of the $NH_3$-oxidation catalyst of oxidizing excess $NH_3$ to nitrogen can be realized only inadequately in practice due to the too low selectivity of the active substituents, for example platinum-containing substituents, so that the oxidation, as shown in the following equations, rather than ending at the oxidation state [0] ends at the oxidation states [+1], [+2] or even only at [+4] and thus again nitrogen oxides result.

$$4NH_3+3O_2 \Rightarrow 2N_2+6H_2O[0] \qquad (3)$$

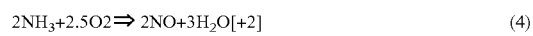
$$2NH_3+2.5O2 \Rightarrow 2NO+3H_2O[+2] \qquad (4)$$

$$2NO+O_2 \leftrightarrow 2NO_2[+4] \qquad (5)$$

$$NH_3+NO_2 \Rightarrow 2NO+H_2O[+2] \qquad (6)$$

In addition, the platinum metals (platinum, palladium, rhodium, iridium, osmium, ruthenium) as well as their oxides, that are used as active material for the $NH_3$-oxidation catalyst, are very expensive and rare. For this reason, the $NH_3$-oxidation catalysts are generally made very small, which means that they are often overloaded, so that there is no complete $NH_3$ conversion.

It is an object of the present invention to provide an arrangement that on the one hand reliably presents ammonia slippage, and on the other hand reduces the residual nitrogen oxide content in the exhaust gas to a minimum. It is furthermore an object to provide a method for producing such an arrangement.

BRIEF DESCRIPTION OF THE DRAWINGS

These and other objects and advantages of the present application will appear more clearly from the following specification in conjunction with the accompanying schematic drawings, in which:

FIG. 5 is a table showing the numeric relationships.

SUMMARY OF THE INVENTION

Figure 1:
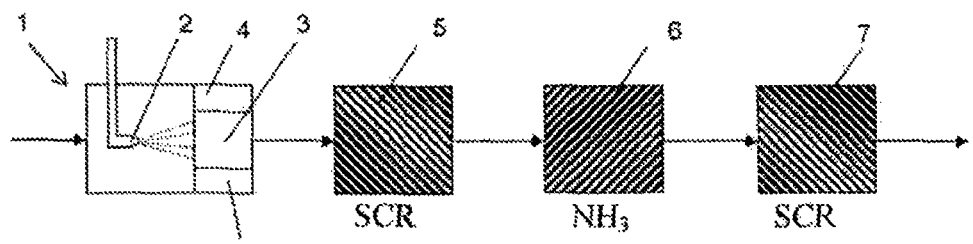
FIG. 1 shows an arrangement for the selective catalytic reduction of exhaust gases.

Pursuant to the arrangement of the present application, for reducing the nitrogen oxide content in the exhaust gas of an internal combustion engine with the aid of ammonia and/or ammonia-releasing reduction agents, whereby ammonia and/or ammonia-containing reduction agent is added to the exhaust gas stream upstream of a catalyst combination comprised of an SCR catalyst and a subsequent $NH_3$-oxidation catalyst in such a way that a mixture of exhaust gas and ammonia is present upstream of the SCR catalyst, the problem is advantageously solved in that at least one second catalyst having SCR activity is disposed downstream of the $NH_3$-oxidation catalyst, and thus the nitrogen oxides formed at the $NH_3$-oxidation catalyst due to insufficient selectivity of the catalyst again react with non-oxidized $NH_3$ and can hence be reduced.

A further advantageous improvement of the system is to provide a second NH₃-oxidation catalyst downstream of the second SCR catalyst in order to similarly oxidize the NH₃ quantities that still occur downstream of the SCR catalyst. This alternative arrangement of the SCR catalyst and/or NH₃-oxidation catalyst can be repeated as often as desired and advantageously contributes to the stability of the overall system.

It can also be advantageous to use different catalyst combinations for the individual SCR catalyst and NH₃-oxidation catalyst and to thus optimize the individual catalyst to the $NO_x$ and $NH_3$ quantities that are produced in the respective region as well as to the exhaust gas temperatures. This means, for example, that the first SCR catalyst and the first NH₃-oxidation catalyst are optimized to high selectivity with regard to the conversion of the initial products into $N_2$, since here the greatest concentrations of the educts $NO_x$ and $NH_3$ are present and hence also he highest concentrations of undesired byproducts of the reaction, such as NO, $N_2O$ or $NO_2$, are to be expected. The subsequent SCR catalyst and NH₃-oxidation catalyst can, in contrast, be optimized to conversion and less to selectivity.

$V_2O_5$-containing mixed oxides, for example in the form of $V_2O_5/WO_3/TiO_2$, can advantageously be used as SCR catalysts. Typical $V_2O_5$ percentages are between 0.2-5%. Furthermore advantageous is the use of zeolite-based catalysts, which contain iron and/or copper and/or cobalt and/or oxides thereof as the active substituents.

The use of the following metals and their oxides are advantageous for the NH₃-oxidation catalyst: platinum and/or palladium and/or iridium and/or rhodium and/or copper and/or nickel. These active substituents can also be embedded in a zeolite matrix.

Advantageously usable as zeolite not only for the embedment of the active substituents having SCR activity but also of the active substituents having NH₃-oxidation activity are the types ZSM-5 and/or OSI and/or EPI and/or AEN and/or MFI and/or FAU and/or BEA.

In this connection, the catalyst can be not only solid catalyst but also coated catalyst.

To reduce the cost of the inventive catalyst arrangement, it is furthermore advantageous to apply the alternatingly arranged SCR catalyst and NH₃-oxidation catalyst, with their different catalyst combinations, on a common support or substrate.

The method of the present invention for producing the inventive catalyst combinations provides various ways of proceeding, depending upon the starting material. For example, the various catalyst combinations can advantageously be applied by immersing a support or substrate into various solutions containing the catalyst, can be dried, and can be subsequently calcined. A further advantageous manner of proceeding provides for producing the various catalyst combinations by impregnating a catalyst layer already applied to a support or substrate or by impregnating a solid catalyst. If metal foils are used as the support or substrate, however, it is advantageous, prior to rolling the individual foils up, to coat them by spraying or brushing, to then subject them to a finishing treatment that includes a drying process, and only then to roll them up to form a honeycomb body.

Further specific features and advantages of the present application will be described in detail subsequently.

DESCRIPTION OF SPECIFIC EMBODIMENTS

Referring now to the drawings in detail, an arrangement for the selective catalytic reduction is schematically illustrated in FIG. 1. The exhaust gases, which are produced by an internal combustion engine (not illustrated) by the combustion processes, and which are symbolized by the arrows in FIG. 1, initially pass into an exhaust gas treatment section 1, in which a reduction agent is added to the hot exhaust gas as close to the engine as possible. As is customary with motor vehicles having SCR catalysts, the reduction agent is an aqueous urea solution; it is of course also possible to add solid urea, as already described in detail in the pertinent technical literature. The dosing is effected as a function of operating parameters of the internal combustion engine, controlled by an engine control unit (not illustrated), in such a way that the aqueous urea solution is sprayed into the exhaust gas stream via a nozzle 2 directly upstream of a hydrolysis catalyst 3. The task of the hydrolysis catalyst 3 is to convert the aqueous urea solution as completely as possible into ammonia and water vapor while avoiding byproducts. Under certain conditions, this disassociation is also adequately effected without a hydrolysis catalyst, in which case the latter car be eliminated. Disposed parallel to the hydrolysis catalyst 3 is an oxidation catalyst 4, the task of which, pursuant to the reaction previously designated by (2), is to oxidize a portion of the nitric oxide contained in the exhaust gas to nitrogen dioxide by means of the excess oxygen present in the exhaust gas; the nitric oxide is considerably more reactive in the subsequent SCR reaction. The actual selective catalytic reduction of the nitrogen oxides is effected in the SCR catalyst 5 that is disposed downstream of the exhaust gas treatment section 1 and that is to convert as great a percentage of the nitrogen oxides ($NO_x$) present in the exhaust gas as possible into nitrogen and water vapor without excess ammonia ($NH_3$) remaining in the exhaust gas stream. In view of the constantly changing operating conditions of an internal combustion engine operated in a vehicle, it is obvious that the desired conversion can take place only incompletely. In order in such cases of insufficient conversion to prevent toxic ammonia from being given off to the atmosphere along with the partially cleaned exhaust gas, an $NH_3$ oxidation catalyst 6 is disposed downstream of the SCR catalyst and is intended to convert the excess $NH_3$ into nitrogen and water vapor. However, this oxidation reaction does not occur selectively enough, so that as previously indicated, again nitrogen oxides result (in this connection see the reactions (3) to (6)). In order to prevent this renewed increase of nitrogen oxides, it has been established to be suitable to dispose a second SCR converter downstream of the NH₃-oxidation catalyst 6 for converting the nitrogen oxides again formed in the NH₃-oxidation catalyst 6, along with the residual ammonia present in the exhaust gas, into nitrogen and water vapor. It should be noted that this presumes that the dimension of the NH₃-oxidation catalyst 6 and the dosing of the aqueous urea solution are such that a small percentage of ammonia is present in the exhaust gas even after the NH₃-oxidation catalyst 6.

Figure 2:
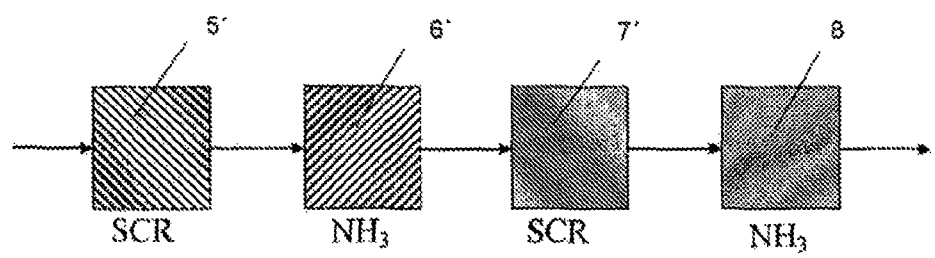
FIG. 2 shows a combination of two SCR/$NH_3$-oxidation catalyst arrangements.

To prevent ammonia that might not be completely converted in the subsequent SCR converter from passing into the atmospheric air, a second NH3-oxidation catalyst 6 can be disposed downstream of the second SCR catalyst. A simplified illustration of such an arrangement is shown in FIG. 2. The exhaust gas treatment section is not shown again in this figure nor in the following figures; rather, in this regard reference is made to what was shown and described in conjunction with the illustration of FIG. 1. Adjoining the illustrated combination of a first SCR catalyst 5' and a first NH₃-oxidation catalyst 6' in the embodiment of FIG. 2 is a further combination of a second SCR catalyst 7' and a second NH₃-oxidation catalyst 8. The indicated sequence of two similar catalyst combinations offers the possibility of further optimizing the conversion reactions by the selection of different active materials for the individual catalysts. For example, it is expedient to design the first catalyst stage for high selectivity. This means in particular that the reactions taking place within the $NH_3$-oxidation catalyst 6' should to the extent possible end at the oxidation state [0]. This can be influenced by the suitable selection of the catalyst material. For example, iridium has a higher selectivity than does platinum; in contrast, with platinum as the catalyst material the conversion rate increases. Thus, if iridium, iridium oxide, or a material having indium substituents is used in the first $NH_3$-oxidation catalyst 6' as the active catalyst material, the conversion of the initial products into nitrogen is optimized since at this location of the arrangement a high concentration of the educts or reactants $NO_x$ and $NH_3$ are present and hence also the greatest concentrations of undesired byproducts of the reaction, such as NO, $N_2O$ or $NO_2$, are to be anticipated if the reaction occurred less selectively. The subsequent second SCR catalysts 7' and the $NH_3$-oxidation catalysts 8, can, in contrast, be optimized to the conversion rate and less to selectivity. In particular, the second $NH_3$-oxidation catalyst 8 is designed for a high conversion rate by the use of platinum, platinum oxide, or a material having platinum substituents.

The previously indicated material particulars with regard to the active components of the $NH_3$-oxidation catalysts are, of course, only examples, especially since the actual catalyst conditions also depend to a large extent on the carrier or substrate material upon which the active catalyst material is applied. This of course also applies to the SCR catalysts. The catalyst 5' can, for example, be a zeolite-based catalyst that contains iron and/or copper and/or cobalt and/or oxides thereof as active components. The second SCR catalyst 7' involves $V_2O_5$-containing mixed oxides, for example in the form of $V_2O_5/WO_3/TiO_2$, as active catalyst materials, also for the reason that at this location of the arrangement, the exhaust gas temperature under all operating conditions does not exceed the temperature of 650° C., above which $V_2O_5$ sublimes.

Figure 3:
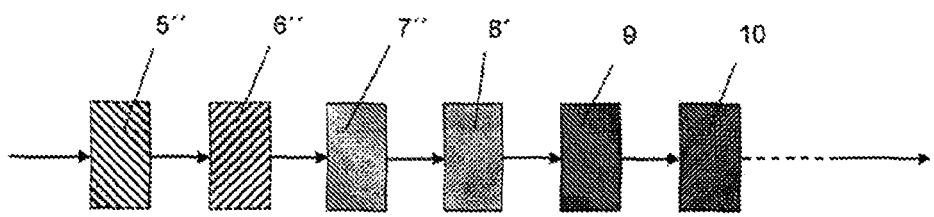
FIG. 3 shows a catalyst arrangement having a plurality of combinations of SCR catalysts and $NH_3$-oxidation catalysts.

The possibility, of course, also exists of combining more than two catalyst combinations to form a catalyst arrangement. A corresponding example is shown in FIG. 3 by way of a drawing showing the principle. FIG. 3 illustrates a first catalyst combination comprised of the SCR catalyst 5" and the $NH_3$-oxidation catalyst 6", a second catalyst combination comprised of a second SCR catalyst 7" and a second $NH_3$-oxidation catalyst 8', followed by a third catalyst combination comprised of a third SCR catalyst 9 and a third $NH_3$-oxidation catalyst 10. The previously indicated alternating sequence of SCR catalysts and $NH_3$-oxidation catalysts can, of course, continue still further, in which connection the arrangement can end not only with an SCR catalyst but also with an $NH_3$-oxidation catalyst. An alternating sequence of catalysts, as described above, has a stabilizing effect upon the overall system. Also applicable with this arrangement is the optimizing possibility described in conjunction with FIG. 2 of the deliberate selection of the active catalyst materials such that in the downstream direction, the selectivity of the reactions decreases while the conversion rate increases.

Figure 4:
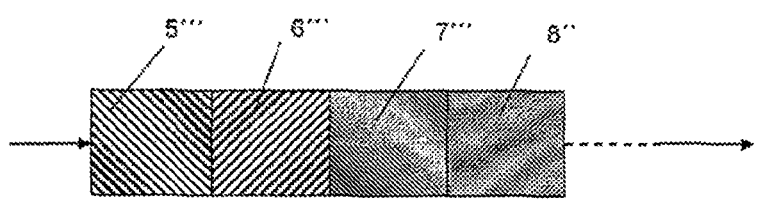
FIG. 4 shows an arrangement similar to that of FIG. 2 on a common support or substrate.

There is also the possibility of disposing the previously described catalyst arrangements on a common support or substrate. For example, FIG. 4 illustrates in a simplified manner a first combination of an SCR catalyst 5''' and an NH3-oxidation catalyst 6''' that together with a second combination of a further SCR catalyst 7''' and a further $NH_3$-oxidation catalyst 8" are disposed on a common support or substrate. Examples of supports or substrates include metal foils that are coated with catalyst components that are active in correspondence to the previously described sequence.

To represent the numerical relationships, in the table shown in FIG. 5, for prescribed $NH_3$ concentrations upstream of the catalyst system, the resulting $NO_x$ and $NH_3$ concentrations (in ppm), which occur with an SCR-$NH_3$-SCR-$NH_3$-catalyst system according to FIG. 2 downstream of the respective catalysts, are given by way of example. Thus, with a below stoichiometric addition of ammonia (800 ppm) there already results downstream of the first SCR catalyst 5' an emission of 230 ppm $NO_x$, and 10 ppm $NH_3$. This $NH_3$ can easily be oxidized at the first $NH_3$ catalyst 6'; there is no appreciable increase of $NO_x$. The subsequent catalysts (second SCR catalyst 7' and second $NH_3$-oxidation catalyst 8) in this case provide no further contribution toward the reduction of the $NO_x$ or $NH_3$ quantities. If in contrast the $NH_3$ concentration is raised to 1000 ppm, after the first $NH_3$-oxidation catalyst 6' the $NO_x$ concentration increases from 220 ppm to 280 ppm; at the same time the $NH_3$ concentration drops from 200 ppm to 20 ppm. With this 20 ppm ammonia, the $NO_x$ concentration at the subsequent second SCR catalyst 7' can be reduced to 260 ppm. The subsequent oxidation of 2 ppm $NH_3$ at the second $NH_3$-oxidation catalyst 8 is complete. The results are even more significant with an over stoichiometric addition (1200 ppm) of $NH_3$. It is here possible to reduce the $NO_x$ concentration downstream of the overall system to 212 ppm and the $NH_3$ concentration to 0. The example shows that with a slightly over stoichiometric addition of $NH_3$, with the inventive catalyst arrangement optimal results can be achieved with regard to the selective reduction of nitrogen oxides to nitrogen without having to fear an ammonia slippage.

With regard to the manufacturing processes for the previously described catalyst arrangements, all manufacturing processes already known in conjunction with the individual catalytic converters are possible. In this connection, the catalysts can be not only solid catalysts, but also coated catalysts.

$V_2O_5$-containing mixed oxides, for example in the form of $V_2O_5/WO_3/TiO_2$, can advantageously be used as SCR catalysts. Typical $V_2O_5$ percentages are between 0.2-5%. Furthermore possible is the use of zeolite-based catalysts, which contain iron and/or copper and/or cobalt and/or the oxides thereof as active substituents.

The use of the following metals and their oxides is advantageous for the $NH_3$-oxidation catalysts: platinum and/or palladium and/or iridium and/or rhodium and/or copper and/or nickel and/or all remaining metals of the platinum group. These active substituents can also be embedded in a zeolite matrix.

With regard to the previously mentioned zeolites, it should be noted that for the applications relevant here the types ZSM-5 and/or OSI and/or EPI and/or AEN and/or MFI and/or FAU and/or BEA are particularly suitable.

Especially with the arrangement of a plurality of catalysts on a support or substrate, the various catalyst combinations can be applied by immersing the support or substrate into various solutions containing the catalyst, can be dried, and can be subsequently calcined. Furthermore, it is possible to produce the various catalyst combinations by impregnating a catalyst layer already applied to a support or substrate or by impregnating a solid catalyst. With the use of metal foils as supports or substrates, it is possible, prior to rolling the individual foils up, to coat them with the various catalyst materials by partially spraying or brushing them, and then subjecting them to a finishing treatment that includes a drying process, and only then rolling them up to form a honeycomb body.

The specification incorporates by reference the disclosure of German priority document 10 2006 031 659.2 filed Jul. 8, 2006.

The present invention is, of course, in no way restricted to the specific disclosure of the specification and drawings, but also encompasses any modifications within the scope of the appended claims.

What I claim is:

1. A method for reducing the nitrogen oxide content in the exhaust gas of an internal combustion engine, including the steps of:
   a) providing a first SCR catalyst;
   b) disposing an $NH_3$-oxidation catalyst downstream of said first SCR catalyst,
   c) disposing at least one second SCR catalyst downstream of said $NH_3$-oxidation catalyst, wherein said first SCR catalyst, said $NH_3$-oxidation catalyst and said at least one second SCR catalyst collectively comprise a catalyst combination;
   d) adding ammonia and/or ammonia-containing reduction agent to an exhaust gas stream upstream of said catalyst combination such that a mixture of exhaust gas and ammonia is present upstream of said first SCR catalyst;
   e) dimensioning said $NH_3$-oxidation catalyst, and selecting an amount for said reduction agent, such that a residual quantity of ammonia is still present in the exhaust gas stream downstream of said $NH_3$-oxidation catalyst; and
   f) converting said residual quantity of ammonia, along with nitrogen oxides formed at said $NH_3$-oxidation catalyst, into nitrogen and water vapor via said at least one second SCR catalyst.

2. A method according to claim 1, wherein at least one second $NH_3$-oxidation catalyst is disposed downstream of said second SCR catalyst.

3. A method according to claim 2, wherein at least one further SCR catalyst, or further SCR catalyst and $NH_3$-oxidation catalyst in alternating sequence, are disposed downstream of said second $NH_3$-oxidation catalyst, and wherein such an arrangement ends with an SCR catalyst or an $NH_3$-oxidation catalyst.

4. A method according to claim 1, wherein the combinations of the respective SCR catalysts differ along a direction of flow of the exhaust gas.

5. A method according to claim 1, wherein the combinations of the respective $NH_3$-oxidation catalysts differ along a direction of flow of the exhaust gas.

6. A method according to claim 1, wherein a first combination of SCR catalyst and $NH_3$-oxidation catalyst is optimized to selectivity by the selective active catalyst materials, and wherein subsequent further SCR catalysts and $NH_3$-oxidation catalysts are optimized to high conversion rates by the selected active catalyst materials.

7. A method according to claim 1, wherein at least a portion of the SCR catalysts contain $V_2O_5$ as active substituents.

8. A method according to claim 1, wherein at least a portion of the SCR catalysts contain iron and/or copper and/or cobalt-containing zeolites.

9. A method according to claim 8, wherein the zeolites are at least one of the types ZSM-5, OSI, EPI, AEN, MFI, FAU and BEA.

10. A method according to claim 1, wherein the $NH_3$-oxidation catalysts contain at least one of the group consisting of platinum, palladium, rhodium, iridium, and their oxides as active components.

11. A method according to claim 1, wherein at least one of the SCR catalysts and the $NH_3$-oxidation catalysts are solid catalysts or coated catalysts on metal or ceramic supports or substrates.

12. A method according to claim 1, wherein the SCR catalysts and the $NH_3$-oxidation catalysts are applied to a common support or substrate.

13. A method according to claim 1, wherein the various catalyst combinations are applied by immersing a support or substrate into various solutions containing the catalysts, are dried, and are subsequently calcined; or wherein the various catalyst combinations are produced by impregnating a catalyst layer already applied to a support or substrate or by impregnating a solid catalyst; or wherein the various catalyst combinations are produced by using metal foils as supports or substrates, prior to rolling the individual foils up, coating them by spraying, subjecting them to a finishing treatment that includes a drying process, and only then rolling them up to form a honeycomb body.

* * * * *